(12) United States Patent
Verbrugge et al.

(10) Patent No.: US 7,832,513 B2
(45) Date of Patent: Nov. 16, 2010

(54) VEHICULAR ELECTRICAL SYSTEM AND CONTROL METHOD THEREFOR

(75) Inventors: Mark W. Verbrugge, Troy, MI (US); Lance W. Turner, Macomb, MI (US); Andres V. Mituta, Rochester, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 974 days.

(21) Appl. No.: 11/457,478

(22) Filed: Jul. 14, 2006

(65) Prior Publication Data

US 2008/0011528 A1  Jan. 17, 2008

(51) Int. Cl.
*B60W 10/26* (2006.01)
(52) U.S. Cl. ............... 180/65.31; 180/65.1; 180/65.21; 180/65.275; 180/65.29; 903/903; 903/904; 903/907
(58) Field of Classification Search ............... 180/65.3, 180/65.4, 65.8, 65.1, 65.275, 65.29; 903/903, 903/904, 907
See application file for complete search history.

(56) References Cited

U.S. PATENT DOCUMENTS

| | | | | |
|---|---|---|---|---|
| 5,121,720 A | * | 6/1992 | Roberts | 123/196 S |
| 5,332,958 A | * | 7/1994 | Sloan | 320/136 |
| 6,281,660 B1 | * | 8/2001 | Abe | 320/103 |
| 6,766,874 B2 | * | 7/2004 | Naito et al. | 180/65.26 |
| 6,886,647 B1 | * | 5/2005 | Gotta | 180/65.1 |
| 7,074,157 B2 | * | 7/2006 | Wakashiro et al. | 477/7 |
| 2001/0026142 A1 | * | 10/2001 | Furukawa et al. | 320/103 |
| 2001/0049571 A1 | * | 12/2001 | Shimizu et al. | 701/22 |
| 2002/0139593 A1 | * | 10/2002 | Charaudeau et al. | 180/65.3 |
| 2005/0284676 A1 | * | 12/2005 | King et al. | 180/65.3 |
| 2006/0110655 A1 | * | 5/2006 | Wirdel | 429/61 |

OTHER PUBLICATIONS

Ehsani et al., Application of Electricall Peaking Hybrid (ELPH) Propulsion System to a Full-Size Passenger Car with Simulated Design Verification, IEEE Transactions on (con't) Vehicular Technology, vol. 48, No. 6, Nov. 1999.
Chu et al., Comparison of commercial supercapacitors and high-power lithium-ion batteries for power-assist applications in hybrid electric vehicles, Journal of (con't) Power Sources112 (2002), pp. 236-246, Elsevier Zorpette, Super Charged, IEEE Spectrum, Jan. 2005.

* cited by examiner

*Primary Examiner*—Frank B Vanaman
*Assistant Examiner*—Bryan A Evans

(57) ABSTRACT

A vehicular electrical system for a hybrid electric vehicle provides a high voltage electrical system having a high power electrical energy storage device (HPD) and a power inverter that cooperate to provide power to a hybrid electric vehicle propulsion system; and a low voltage electrical system having a low voltage power source, at least one accessory power load, and a control switch that toggles between an opened and a closed position to control the flow of current flowing between the low voltage power source and the HPD. A method of using the vehicular electrical system provides the step of using the HPD and power inverter to provide power to the electric vehicle propulsion system; and opening a control switch to isolate the low voltage system from the high voltage system and closing a control switch to charge the HPD.

18 Claims, 2 Drawing Sheets

VEHICULAR ELECTRICAL SYSTEM AND CONTROL METHOD THEREFOR

TECHNICAL FIELD

The present invention is related to vehicular energy storage and retrieval. More particularly, the invention relates to electrical energy storage and retrieval in a hybrid electric vehicle.

BACKGROUND OF THE INVENTION

Battery-electric vehicles (BEV) and hybrid-electric vehicles (HEV) include one or more electric machines (propulsion motors) as part of a vehicle propulsion system. An HEV, in addition, includes a heat engine such as an internal combustion engine as part of the vehicle propulsion system. HEV may be generally categorized as strong or mild. Strong hybrids are characterized by high torque propulsion motors capable of imparting significant driveline torque contributions across a wide range of vehicle operating regions for traction and regenerative braking. Strong hybrids may further take form in series hybrid architecture, parallel hybrid architecture and series/parallel architectures. Mild hybrids are generally implemented in parallel hybrid architectures. Mild hybrids are characterized by lower torque propulsion motors capable of more limited driveline torque contributions in terms of magnitude and vehicle operating regions.

One desirable feature of HEV is engine off idling, which allows for the internal combustion engine to be shut down during decelerations and traffic signal stops, for example. Such engine off idling can contribute to improvements in engine emissions and fuel economy. Engine starting and electric power generation may be accomplished via the same electric machines used for propulsion and regenerative braking thereby supplanting the need for conventional starter motor and alternator. Engine off idling requires an electrically powered accessory drive system implemented, for example, by individual direct motor driven pumps, compressors or other rotating machines, or an electrically driven accessory belt and pulley system for imparting rotating motion to a plurality of such rotating machines.

HEV include high and low voltage electrical systems. The high-voltage electrical system supports the energy and power requirements of the electric traction machines. The low voltage system supports vehicle electrical accessories. High-voltage and low-voltage electrical systems are interfaced via DC-DC converters. Electrical energy storage is typically via one or more energy storage devices such as batteries. Batteries may be associated with either the high-voltage or the low voltage electrical systems or both.

Generally, as between power density and energy density, power density is a more critical characteristic for batteries servicing HEV electric machines. Hence, the types of batteries employed in HEV are designed to sustain high-currents. Consequently, deep discharges of batteries are not generally desirable as such tend to shorten useful battery life, and battery state of charge (SOC) is desirably maintained in a relatively narrow range toward an upper region thereof. However, vehicle electrical accessory loads during engine off idle can be a substantial source of battery discharge. An additional source of significant battery discharge during engine off idle is any electrical motor associated with operation of an electrically powered accessory drive system. It can therefore be appreciated that the electrical accessory and propulsion motor electrical power density and energy density requirements are divergent. Employing a high power density battery in HEV will suffer battery longevity. Similarly, employing a high energy density battery will suffer HEV performance and operational flexibility.

While it is generally well recognized that high power electrical storage devices, such as supercapacitors, may provide many of the desired characteristics in a high voltage energy source for HEV, it is also well recognized that supercapacitors store far less energy than batteries and can be depleted rapidly when subjected to sustained electrical loads, which is an undesirable trait for vehicular use since periods of inactivity would result in unacceptable starting voltage states or accelerated discharge of vehicle batteries during such periods.

SUMMARY OF THE INVENTION

A vehicular electrical system and control method is provided for use in a HEV to prevent draining of a low voltage battery and rapid discharging of an associated high power electrical energy storage device (HPD). In accordance with one embodiment of the invention, a vehicular electrical system for a hybrid electric vehicle includes a high voltage electrical system having a HPD and a power inverter that cooperate to provide power to a hybrid electric vehicle propulsion system. Also included is a low voltage electrical system having a low voltage power source, at least one accessory power load, and a control switch that toggles between an opened and a closed position to control the flow of current flowing between the low voltage power source and the HPD.

In accordance with one embodiment of the invention, a method for using the vehicular electrical system for a HEV includes: providing a high voltage electrical system having a HPD and a power inverter that cooperate to provide power to a hybrid electric vehicle propulsion system; providing a low voltage electrical system having a low voltage power source, at least one accessory power load, and a control switch; and toggling the control switch between an opened and a closed position to isolate the low voltage system from the high voltage system when the switch is opened and to charge the HPD when the control switch is closed.

BRIEF DESCRIPTION OF THE DRAWINGS

These and other aspects of the present invention will be more fully understood with reference to the description herein below and the following drawings in which.

DESCRIPTION OF THE PREFERRED EMBODIMENT

Figure 1:
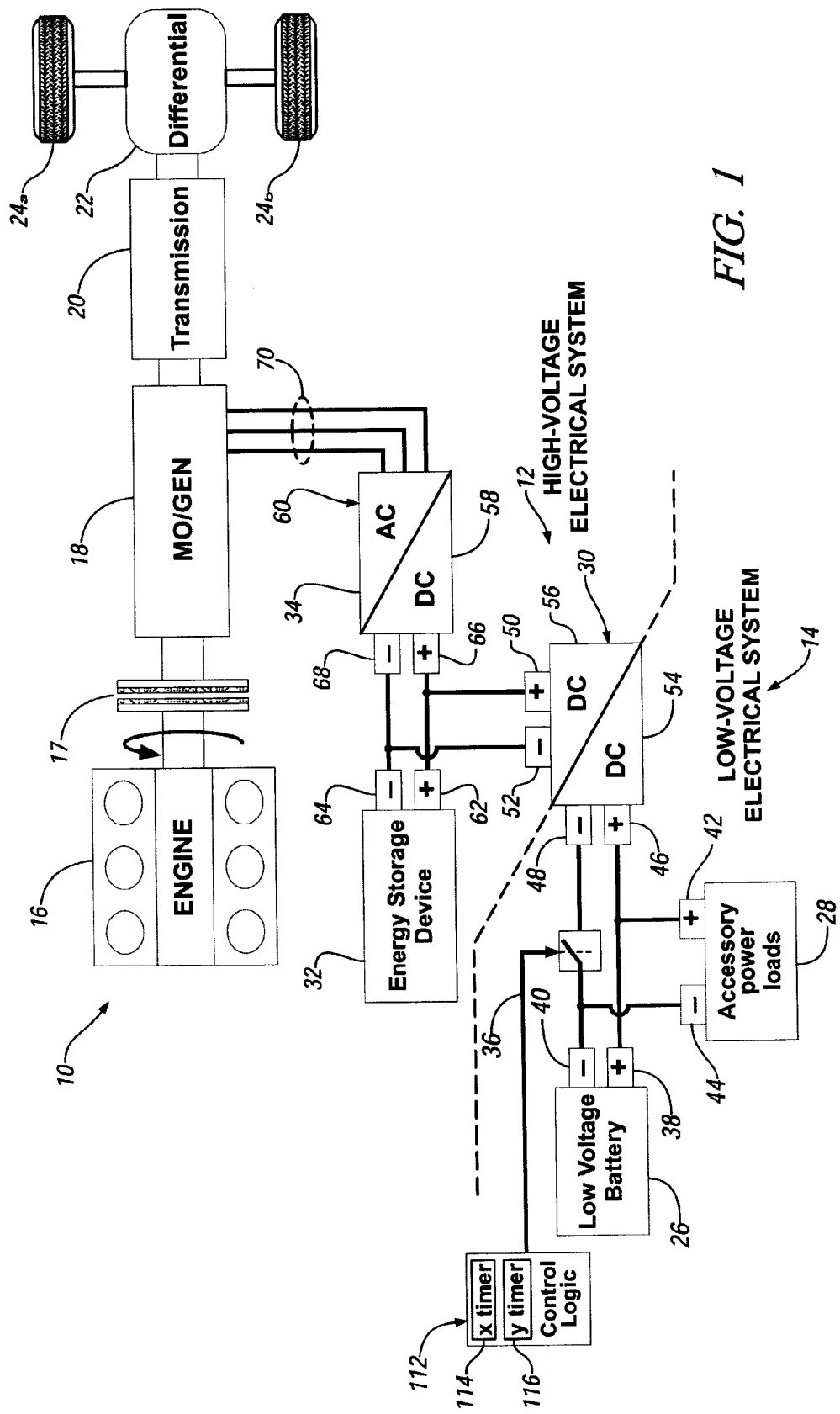
FIG. 1 is a block system diagram of a vehicular electrical system on a hybrid electric vehicle in accordance with one embodiment of the invention.

The invention is directed to a vehicular electrical system and control method for a HEV that provides an electrical energy storage device having a high power to energy ratio for use in combination with a DC to DC converter that interfaces a low voltage electrical system with a high voltage electrical system. A high power to energy ratio is defined as substantially a power to energy ratio (W/Whr, or 1/hr) greater than 15 inverse hours. The HPD may be for example, a high voltage supercapacitor (SC) or an electrochemical storage device such as a lithium ion battery. Typically, a SC has an effective power to energy ratio of about 400 inverse hours. Additionally, a lithium ion battery typically has an effective power to energy ratio of about 20 inverse hours.

The vehicular electrical system and control method disclosed herein operates to reduce the draining of low voltage batteries during discharging of the high power electrical energy storage device.

More particularly, one embodiment of the invention operates to isolate the low voltage battery from the high power electrical energy storage device so that parasitic currents required to maintain the high power electrical energy storage device state of charge do not drain the low voltage battery. Thus, the vehicular electrical system and control method is provided for use in a HEV to prevent draining of a low voltage battery and discharging of an associated HPD.

Generally, the accessory power loads, which are not explicitly associated with the propulsion systems, constitute low maximum currents relative to conventional starting, lighting, ignition (SLI) batteries. Hence, because all traction applications, including engine starting operation, are to be handled by the HPD, the accessory power battery may be optimized around energy and life with less of an emphasis on metrics like cold-cranking amperage.

The vehicular electrical system and control method of at least one embodiment of the invention operates to avoid the discharge problems of HPD, such as supercapacitors or lithium ion batteries in propulsion systems; and eliminates a need for combination high voltage battery and pre-charge circuits that are necessary in conventional HEV applications to balance the potential of two storage devices.

Additionally, the DC to DC converter allows for bi-directional communication between high voltage and low voltage electrical systems which allow for: recovering of excess regenerative energy and distributing to low voltage load; safely discharging of a HPD through vehicle loads for serviceability; and eliminating a mechanical alternator, such as a 12 volt alternator. Additionally, the DC to DC converter operates to keep the HPD charged when the engine is off for a predefined time and is not in a regenerative mode.

An embodiment of the invention provides a DC to DC converter that interfaces with both a low voltage and a high voltage electrical system and provides a control switch operated by control switch logic associated with the low-voltage electrical system, wherein the low-voltage electrical system provides low voltage power to accessory loads.

Generally provided is a vehicular electrical system for a hybrid electric vehicle providing a high voltage electrical system having a HPD and a power inverter that cooperate to provide power to a hybrid electric vehicle propulsion system; and a low voltage electrical system having a low voltage power source, at least one or a plurality of accessory power loads, and a control switch that toggles between an opened and a closed position to control the flow of current flowing between the low voltage power source and the HPD.

The hybrid electric vehicle propulsion system includes an internal combustion engine; and at least one electric machine that cooperate to provide propulsion to the HEV. Additionally, in one embodiment of the invention, the HPD is a supercapacitor and the HEV is a strong hybrid. In another embodiment of the invention, the HPD is a high voltage lithium ion battery and the HEV is a mild hybrid.

Also, in one embodiment of the invention, the low voltage power source is a conventional low voltage battery such as, but not limited to a 12V lead acid battery.

Additionally, an interface is provided between the low voltage electrical system and the high voltage electrical system that cooperates with the control switch and the low voltage power source to charge the HPD. The interface may be for example, a buck boost converter that cooperates with the control switch to prevent draining of the low voltage power source when the HPD discharges, when the engine is off a predetermined amount of time, and when the engine is not in a regenerative mode. The buck boost converter is in bi-directional communication with both the high voltage and the low voltage electrical systems and may be in the form of a DC to DC converter.

In operation, when the control switch is closed, the buck boost converter is electrically connected to the low voltage power source and wherein the buck boost converter cooperates with the low voltage power source to provide current to the HPD for a predefined time and to thereby charge the HPD to a predefined voltage. Additionally, when the control switch is opened, the low voltage electrical system is isolated from the high voltage electrical system.

Figure 3:
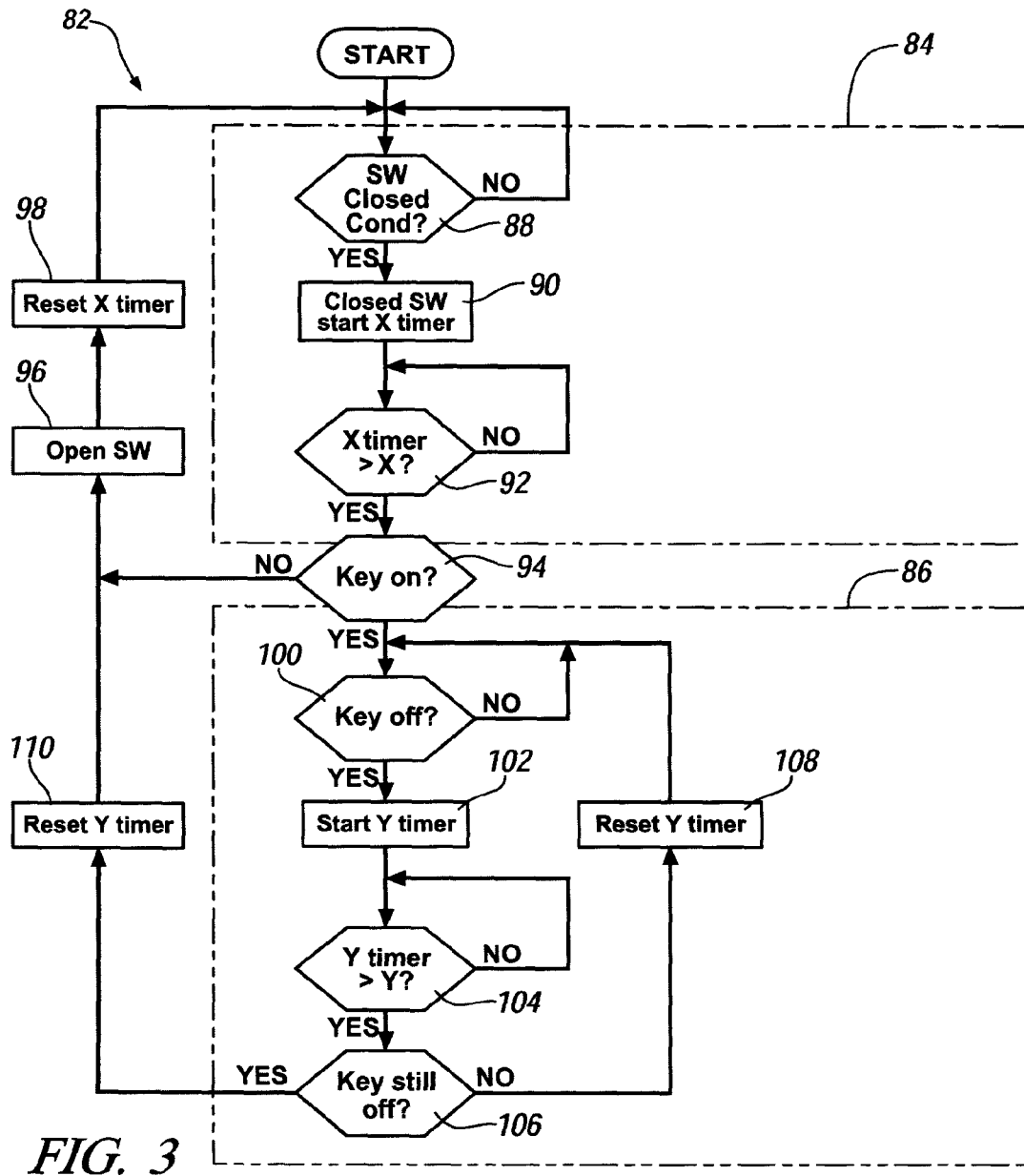
FIG. 3 is a flow chart illustrating control logic associated with controlling toggling of a control switch between an opened and a closed condition in accordance with one embodiment of the invention.

Control switch logic is provided to toggle the control switch between the opened and closed positions in accordance with a predefined set of conditions as described in more detail herein with reference to FIG. 3.

A block diagram of the vehicular electrical system 10 is shown in FIG. 1. FIG. 1 represents an HEV using the vehicular electrical system and control method in accordance with an embodiment of the invention. The vehicular electrical system 10 includes a high voltage electrical system 12 associated with powering a vehicle propulsion system and a low voltage electrical system 14 associated with powering one or more accessory loads. A DC to DC converter 30 operates to interface the high voltage electrical system with the low voltage electrical system. The DC to DC converter 30 has a low voltage portion 54 having an associated low voltage negative and positive terminal 48, 46, respectively, and a high voltage portion 56 having an associated high voltage negative and positive terminal 52, 50, respectively. DC to DC converter 30 may be a buck boost converter that functions in a bi-directional manner to either step a low voltage of, for example, 12 volts up to a high voltage of, for example, 300 volts or to step down a high voltage such as 300 volts to a low voltage such as 12 volts. Additionally, the high voltage positive terminal 50 of the DC to DC converter 30 is electrically connected in parallel to the positive terminal 62 of the HPD 32 and further to the positive DC terminal 66 of the DC to AC power inverter 60.

The high voltage negative terminal 52 of the DC to DC converter 30 is connected in parallel with the negative terminal 64 of the HPD 32 and with the negative DC terminal 68 of the DC to AC power inverter 60. The DC to AC power inverter 60 provides a three phase AC power output 70 and is in electrical communication with the motor/generator 18 to provide three phase electrical power interface with motor/generator 18.

The exemplary parallel HEV's vehicle propulsion system is defined by an engine 16 such as a heat or internal combustion engine coupled through a clutch 17 to a motor/generator 18. The motor/generator 18 is also coupled with a transmission 20. The transmission 20 is coupled to a differential 22, wherein the differential operates to drive two or more wheels 24*a*, 24*b* as shown in FIG. 1. The motor/generator 18 is in electrical communication with a power inverter 60 such as a DC to AC inverter and is in further electrical communication with a HPD 32 associated with the high voltage system 12 through inverter 60. Motor/generator 18 is in further electrical communication with the low voltage electrical system 14 through the DC to DC converter 30.

More particularly, the low voltage electrical system 14 has a low voltage power source 26 which may be, for example a conventional battery such as a lead acid battery having a positive and a negative terminal 38, 40, respectively, in operable electrical communication with one or more accessory power loads each having an associated positive and negative terminal 42, 44, respectively, and wherein the low voltage power source 26 is in further electrical communication with the DC to DC converter 30.

A control switch 36 is a power switch which operates to turn on and off power from the low voltage battery 26 to the HPD 32. Control switch is illustrated schematically in FIG. 1 and may, for example, include any of a variety of appropriate mechanical switch implementations (e.g. electro-mechanical relay) or solid state implementations (e.g. IGBT). The control switch 36 is controlled in accordance with control switch logic 112, wherein the control switch logic includes an associated X timer 114, and an associated Y timer 116 as shown in FIG. 1.

The high voltage power inverter 60 is provided to bi-directionally convert DC current to AC current and vice-versa. The power inverter 60 has a DC portion 58 having an associated positive and negative terminal 66, 68, respectively, and an AC portion 34 having an associated three phase power output 70.

In one embodiment of the invention, the HPD may be one or more HPDs connected in series to operate at higher voltages. The HPD 32 has an associated positive terminal 62 and an associated negative terminal 64. The power inverter 60 also works in a bi-directional manner to convert DC current into AC current or vice versa. A positive terminal 66 and a negative terminal 68 are associated with the DC portion 58 of the DC to AC converter. Additionally, on the AC portion 34 of the DC to AC converter, a three phase source 70 is provided to the motor/generator 18.

Figure 2:
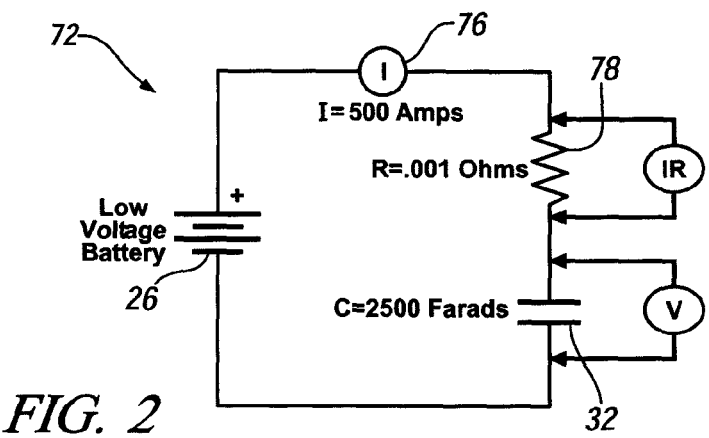
FIG. 2 is an electrical schematic of a circuit having a low voltage battery source and a HPD in accordance with one embodiment of the invention.

Additionally, a schematic of the operation of the vehicular electrical system is shown in FIG. 2. FIG. 2 illustrates a low voltage source, the low voltage battery 26 having a current I flowing therethrough and an equivalent resistance 78 which represents wires and the HPD's internal resistance, and the HPD 32. When the current I flows through the resistance 78, for example when the current is equal to 500 amps and the resistance is equal to 0.001 Ohms, the capacitance of the HPD is 2500 farads, the voltage across resistance 78 (IR) represents a voltage loss associated with resistance of a load, for example 500 amps times the resistance of the resistor, 0.001 Ohms to equal a voltage drop of 0.5 volts DC across resistance 78.

When the switch 36 is closed, the voltage calculated across the HPD is equal to It/C (neglecting the internal resistance of the capacitor device), wherein I equals the current flowing through the HPD, t equals the time that the current flows through the HPD to charge the HPD, and C equals the capacitance of the HPD.

In an embodiment of the invention the high power electrical energy storage device 32 is a supercapacitor (SC). The supercapacitor 32 may be selected from any supercapacitor that has come or may come into existence. Preferably, the SC has an associated gravimetric energy density of about 1 to 10 Wh/Kg. high-voltage supercapacitors for HEV applications indicate improved miles per gallon over batteries due to the lower impedance of the supercapacitors. The energy of HEV batteries for most driving conditions is not needed; instead power is the dominant concern. Supercapacitors are thus well suited for high power, high current applications. However, due to the tendency of capacitors to self discharge on stand, avoidance of self-discharging is needed to start the vehicle or keep accessory power live during vehicle stand. Self discharge includes discharge of the capacitor through the supply of electricity to the accessory power loads that can be removed by opening the toggle switch as is disclosed herein.

Typically, it takes about eleven (11) seconds for a high power electrical energy storage device such as a SC to charge. For example, 500 A is a reasonable current draw from a low voltage battery associated with the low voltage electrical system, such as an accessory power battery to charge a HPD. Using a low voltage battery and a state-of-the art HPD, the time needed to charge the HPD with a current draw of 500 A is eleven seconds. At half the current, about 250 A, it will take about 25 s to charge the HPD.

For example, referring to FIG. 2, in the embodiment where the HPD is a SC, when the SC is fully discharged, the open circuit voltage across the SC is 0 volts DC. Once the SC is charged, after about 11 seconds, the final voltage across the SC is equal to 500 A times 11 seconds divided by 2500 F, and thus the final voltage across the SC totals 2.2 volts DC.

When the switch 36 is opened, the opened switch 36 configuration operates to isolate the low voltage electrical system 14 from the high voltage electrical system 12. Thus, when the switch 36 is opened, the accessory power loads 28 are electrically connected in parallel to the low voltage battery 26 and are therefore, powered by the low voltage battery 26. Additionally, when the switch 36 is opened, the DC to DC converter 30 is isolated from the low voltage battery 26 and thus, the HPD is also isolated from the low voltage battery 26 thereby preventing draining of the low voltage battery 26 by the HPD 32 when the HPD is discharged.

In a closed switch configuration, the low voltage electrical system 14 is no longer isolated from the high voltage electrical system 12. The DC to DC converter 30 is electrically connected in parallel to the accessory power loads 28, and the accessory power loads 28 are also connected in parallel to the low voltage battery 26. The negative terminal 40 of the low voltage battery 26 and the negative terminal 48 of the low voltage portion 54 of the DC to DC converter 30 are in electrical communication with each other, wherein the switch 36 is in series with the DC to DC converter 30 and is also in series with the low voltage battery 26.

The accessory power load positive terminal 42 is connected to the low voltage battery positive terminal 38, and the DC to DC positive terminal 46 is connected in parallel to the low voltage battery positive terminal 38 and with the accessory power load positive terminal 42. The switch 36 is connected in series between the negative terminal 40 of the low voltage battery 26 and the negative terminal 48 of the DC to DC converter 30. A chassis (not shown) associated with the vehicle is also in communication with the low voltage side 54 of the DC to DC converter 30. By connecting the negative terminal 48 of the DC to DC converter low voltage side 54 to the negative terminal of the low voltage battery high energy surges are prevented from being communicated to the chassis of a vehicle, thereby eliminating a ground path to the chassis from the high voltage side 56 of the DC to DC converter 30.

In operation, when the switch 36 is closed, the DC to DC converter 30 is electrically connected to the low voltage battery 26 thereby providing high voltage to the HPD 32 and thus charging the HPD 32 to a predefined voltage.

A method of controlling the electrical traction system 12 for a hybrid electric vehicle (HEV) includes a high voltage electrical system having a HPD and a power inverter that cooperate to provide power to a hybrid electric vehicle propulsion system;

a low voltage electrical system having a low voltage power source, at least one accessory power load, and a control switch; and a control switch that toggles between an opened and a closed position to isolate the low voltage system from the high voltage system when the switch is opened and to charge the HPD when the control switch is closed. A buck boost converter is provided to interface the low voltage electrical system with the high voltage electrical system. Additionally, the low voltage power source is used in combination with the buck boost converter to charge the HPD when the switch is closed; control logic is used to control the toggling of the switch is opened between the opened and closed positions; and the switch in accordance with the control logic to prevent draining of the low voltage battery when the HPD discharges.

A control method for controlling the vehicular electrical system includes performing a start up timeout procedure for a valid propulsion request, wherein the start up timeout procedure determines if a control switch closed condition has occurred in accordance with a predefined set of hierarchical conditions, and closing the switch upon occurrence of a switch closed condition. The predefined set of hierarchical conditions may be defined, for example, as a key fob is sensed by the vehicle, a driver's side door opens, a mass is determined in the driver's seat, a driver's seatbelt is buckled, a key is engaged within an ignition switch in an off position, or a key is engaged within an ignition switch in the on position.

After the start up timeout procedure is performed, a determination is made if a key is on after the control switch has been closed for at least X number of minutes. A shut down timeout procedure is performed for a short stop time of the vehicle if the key is on after the control switch has been closed for at least X number of minutes. The control switch will be opened upon completion of the shut down timeout procedure if the key is off and at least Y number of minutes has accumulated since the key turned off. However, the control switch is kept closed if the key is on after at least Y number of minutes has accumulated since the key was initially turned off.

In operation, when a customer approaches the vehicle, the vehicle senses the key fob and closes the control switch, thus charging the HPD. If the switch is closed for a time equal to or greater than X number of minutes after a switch closed condition has occurred and the key is in the off position, then the switch opens. Other actions that cause the vehicle to close the switch may include, but are not limited to the opening of the driver's side door, mass in the driver's seat, buckling of driver's seat belt, key in the ignition switch but in an off position ("key off"), or key in the ignition switch but in an on position ("key on"). These conditions are hierarchical, and are determined using diagnostics in a hierarchical manner wherein the first action performed that indicates occurrence of a switch closed condition is sensing a key fob. If for any of the conditions, with the exception of "key on" the switch is closed for >Y minutes and the key is off, then the switch opens until activated once again by occurrence of another switch closed condition.

A flow diagram 82 of switch control logic used to control the switch is shown in FIG. 3. Initially, it is determined if a switch closed condition has occurred 88) in accordance with a predefined set of hierarchical conditions. The hierarchical conditions may include presence sensing conditions as described herein above including: a key fob is sensed by the vehicle, a driver's side door opens, a mass is determined in the driver's seat, a driver's seatbelt is buckled, a key is engaged with the ignition in an off position, or a key is engaged with the ignition in the on position but the ignition is not running.

If no switch closed position occurs the determination is continuously made whether a switch closed condition has occurred (88) until a switch closed condition occurs. Once a switch closed condition occurs, the switch 36 is closed (90) and simultaneously an X timer is started. Next, it is determined if an X number of minutes on the timer has accumulated (92) until predefined number of minutes equals at least X minutes. Once X number of minutes has accumulated then a determination is made if the key is in an on position (94). A start up procedure timeout procedure for a valid propulsion request is performed (84) after the determination is made whether the key is on (94). When it is determined that the key is not on (94) then the switch 36 is opened (96). Once the switch has been opened, then the X timer is reset (98) and the start up timeout procedure for a valid propulsion request (84) is repeated.

If it is determined that the key is on, then a shut down time out procedure that comprehends a short stop of the vehicle (86) is performed. The procedure 86 initially determines if the key has been subsequently turned off (100). Once it is determined that the key is off, a Y timer is run (102, 104) until Y number of minutes has accumulated. Once Y number of minutes has accumulated, a determination is made if the key is still off (106). If the key is not off, then the Y timer is reset (108) and the shut down time out procedure that comprehends a short stop time of the vehicle (86) is once again performed.

If the key is still off after repeating procedure 86, then the Y timer is reset (110), the switch is opened (96), the X timer is reset (98), and the start-up timeout procedure for a valid propulsion request (84) is repeated.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A vehicular electrical system for a hybrid electric vehicle (HEV) comprising:
    a high voltage electrical system having a high power electrical energy storage device (HPD) and a power inverter that cooperate to provide power to a HEV propulsion system;
    a low voltage electrical system having a low voltage power source, at least one accessory power load, and a control switch operated by a control switch logic to one of an opened and a closed state;
    a DC to DC converter between the low voltage electrical system and the high voltage electrical system;
    said control switch logic controlling the control switch to the opened state electrically isolating the low voltage electrical system from the high voltage electrical system when a key is not engaged with an ignition switch in a key on position until one of a plurality of hierarchical conditions being met indicates an impending propulsion request;
    said control switch logic controlling the control switch to the closed state electrically connecting the low voltage electrical system to the high voltage electrical system to charge the high voltage power source from the low voltage power source when at least one of a plurality of hierarchical conditions indicates an impending propulsion request; and
    said control switch logic controlling the control switch to the opened state electrically isolating the low voltage electrical system from the high voltage electrical system wherein none of the plurality of hierarchical conditions have resulted in a propulsion request at the expiration of a predetermined duration.

2. The vehicular electrical system of claim 1, wherein the HEV propulsion system comprises:
an internal combustion engine; and
at least one electric traction machine that cooperate to provide propulsion to the HEV.

3. The vehicular electrical system of claim 1, wherein the DC to DC converter comprises: a buck boost converter in bi-directional communication with both the high voltage and the low voltage electrical systems.

4. The vehicular electrical system of claim 1, further comprising: a lead acid battery defining the low voltage power source.

5. The vehicular electrical system of claim 1, wherein the HPD comprises a supercapacitor.

6. The vehicular electrical system of claim 1, wherein the HPD comprises a lithium battery.

7. The vehicular electrical system of claim 1, wherein when the control switch is in the opened state, the low voltage electrical system is isolated from the high voltage electrical system.

8. The vehicular electrical system of claim 1, wherein the accessory power load further comprises a plurality of accessory power loads.

9. The vehicular electrical system of claim 1, wherein the plurality of hierarchical conditions comprises conditions occurring in advance of the key being engaged with the ignition switch in the key on position.

10. The vehicular electrical system of claim 9, wherein the conditions occurring in advance of the key being engaged with the ignition switch in the key on position are selected from the group consisting of a key fob sensing, a door opening, a seating mass, a seat belt buckling, and the key being engaged with the ignition switch in a key off position.

11. The vehicular electrical system of claim 1, wherein the plurality of hierarchical conditions comprises the key being engaged with the ignition switch in the key on position.

12. The vehicular electrical system of claim 1, wherein the control switch comprises a mechanical switch.

13. The vehicular electrical system of claim 1, wherein the control switch comprises a solid state switch.

14. The vehicular electrical system of claim 1, wherein said key not engaged with the ignition switch in the key on position comprises said key engaged with the ignition switch in a key off position.

15. The vehicular electrical system of claim 1, wherein said predetermined duration is a first predetermined time measured from said at least one of the plurality of hierarchical conditions indicating an impending propulsion request.

16. The vehicular electrical system of claim 1, wherein said predetermined duration comprises a first predetermined time measured from said at least one of the plurality of hierarchical conditions indicating an impending propulsion request and terminating coincident with said key engaged with the ignition switch in the key on position, and a second predetermined time measured from the termination of the first predetermined time and terminating coincident with said key not engaged with the ignition switch in the key on position.

17. The vehicular electrical system of claim 16, wherein said key not engaged with the ignition switch in the key on position comprises said key engaged with the ignition switch in a key off position.

18. The vehicular electrical system of claim 1, wherein charging the high voltage power source from the low voltage power source comprises charging at a current draw from the low voltage power source at or above about 250 amperes.

* * * * *